United States Patent
Barratt

(10) Patent No.: US 7,802,624 B2
(45) Date of Patent: Sep. 28, 2010

(54) STABPLATE CONNECTIONS

(75) Inventor: Richard K. O. Barratt, Cypress, TX (US)

(73) Assignee: Vetco Gray Controls Limited, Bristol (GB)

( * ) Notice: Subject to any disclaimer, the term of this patent is extended or adjusted under 35 U.S.C. 154(b) by 0 days.

(21) Appl. No.: 12/233,038

(22) Filed: Sep. 18, 2008

(65) Prior Publication Data

US 2010/0065277 A1 Mar. 18, 2010

(51) Int. Cl.
*E21B 43/01* (2006.01)

(52) U.S. Cl. ............... 166/338; 166/341; 166/344; 166/347; 166/352; 405/158

(58) Field of Classification Search .......... 166/338, 166/341, 344, 347, 352; 405/158, 169
See application file for complete search history.

(56) References Cited

U.S. PATENT DOCUMENTS

| | | | | |
|---|---|---|---|---|
| 4,469,136 A * | 9/1984 | Watkins | ............... | 137/798 |
| 4,472,081 A * | 9/1984 | Lawson | ............... | 405/169 |
| 5,195,589 A * | 3/1993 | Mota et al. | ............... | 166/341 |
| 5,244,045 A * | 9/1993 | Mota | ............... | 166/341 |
| 6,102,124 A * | 8/2000 | Skeels et al. | ............... | 166/347 |
| 6,481,504 B1 * | 11/2002 | Gatherar | ............... | 166/344 |
| 6,588,985 B1 * | 7/2003 | Bernard | ............... | 405/191 |
| 6,880,640 B2 * | 4/2005 | Barratt et al. | ............... | 166/346 |
| 6,923,225 B2 * | 8/2005 | Poldervaart et al. | ......... | 141/387 |
| 7,172,447 B2 * | 2/2007 | Allensworth et al. | ......... | 439/271 |
| 7,314,084 B2 * | 1/2008 | Rodrigues et al. | ........... | 166/344 |
| 7,318,479 B2 * | 1/2008 | Williams | ............... | 166/341 |
| 7,422,066 B2 * | 9/2008 | Rodrigues et al. | ........... | 166/341 |
| 7,467,662 B2 * | 12/2008 | Smith | ............... | 166/343 |
| 2007/0227740 A1 * | 10/2007 | Fontenette et al. | .......... | 166/344 |
| 2008/0143100 A1 * | 6/2008 | Webster | ............... | 285/18 |
| 2010/0059229 A1 * | 3/2010 | Smith et al. | ............... | 166/346 |

FOREIGN PATENT DOCUMENTS

EP  545551 A2 *  6/1993

OTHER PUBLICATIONS

"Flying Lead Connector"; http://www.oceanworks.com/flyingLeadConnector.php; OceanWorks International 2008.
"Viper Flying Lead Connector"; www.oceanworks.com; Oceanworks International 2008 pp. 1-2.
"Terminator Bravo—MQC 10/XX ROV/CS"; Unitech; Form No. 035B; Doc. No. 876/S; Rev. E/05.12.06; Aug. 21, 1998; pp. 1-4.
"Loose Steel Flying Lead (LSFL) Installation Procedure"; Deep Down Inc.

* cited by examiner

*Primary Examiner*—Thomas A Beach
*Assistant Examiner*—Matthew R Buck
(74) *Attorney, Agent, or Firm*—Bracewell & Giuliani LLP

(57) ABSTRACT

An underwater stabplate connection is provided by lowering a counterbalanced first part of the connection in a horizontal disposition by a lift line, the first part being attached to an umbilical. The first part of the connection mates with a second part of the connection, the second part being attached to an underwater structure such as a well tree.

8 Claims, 1 Drawing Sheet

STABPLATE CONNECTIONS

FIELD OF THE INVENTION

The present invention relates to stabplate connections.

BACKGROUND

Subsea structures (such as well trees, subsea manifolds and subsea distribution units) in subsea hydrocarbon extraction or injection wells are supplied with at least one of (for example) electric power, hydraulic power, electrical signals, optical signals and chemicals from a control platform or surface vessel via an umbilical, which could be in the form of a hydraulic flying lead (HFL) such as a steel tube flying lead (SFL). The umbilical is typically terminated with a connector which mates with another connector mounted on a stabplate attached to the subsea structure, such as a tree. Stabplate connections are, historically, made up in a horizontal orientation. However, as umbilicals, for example HFLs, become heavier and more unwieldy this leads to designs with the need for increased buoyancy, which increases in-air weight and overall costs.

With such conventional horizontally connected stabplate connections, the installation vessel is typically decoupled from the installation and involves a remotely operated vehicle (ROV) dragging the umbilical across the seabed, which, in some seabed conditions (e.g. Gulf of Mexico, West Africa) leads to a decrease in visibility due to disturbance of sand or silt.

U.S. Pat. Nos. 4,469,136 and 6,481,504 disclose connecting flow lines to an underwater structure by a vertical connection.

Deep Down Inc., of 15473 East Freeway, Channel View, Tex. 77530, USA have disclosed a method of installing an SFL in which the latter is lowered vertically but connected horizontally to a tree using an ROV.

Unitech Offshore AS, of Bergen, Norway N-5004 have produced an ROV installed stabplate connection in which an ROV drops an HFL stabplate on to vertical pins but then mates the stabplate to a structure in a horizontal direction.

OceanWorks International, Inc. of 11611 Tanner Road, Suite A, Houston, Tex. 77041, USA have produced a flying lead connector having a stab connection which can be connected vertically or horizontally using an ROV. See also U.S. Pat. No. 7,172,447.

SUMMARY OF THE INVENTION

According to the present invention from one aspect, there is provided a method of providing an underwater stabplate connection, comprising:
  providing at an underwater structure a first part having first, mateable portion of the stabplate connection;
  providing a second part of the stabplate connection, the second part having an umbilical connected at a region of the underside of the second part between a second mateable portion of the stabplate connection and a counterweight portion of the second part; and
  lowering the second part together with the umbilical using a lift line connected to the second part at a region above said region of the underside of the second part, so that the second part is disposed substantially horizontal during lowering, and causing said first and second portions to mate with each other. Said umbilical may be selected from the group consisting of: an umbilical which carries at least one of electric power, hydraulic power, electrical signals, optical signals and chemicals; a hydraulic flying lead; and a steel tube flying lead.

Said second part and said umbilical could be lowered from a surface vessel.

Said causing could be carried out using a remotely operated vehicle.

Said first and second portions could be disposed so that they mate with each other in a vertical direction.

Said structure could comprise a well tree.

Said region at which said lift line is connected to said second part could be directly above said region of the underside of said second part.

The present invention also comprises an underwater stabplate connection provided by the method of the invention.

According to the present invention from a further aspect, there is provided apparatus for providing an underwater stabplate connection, comprising:
  a first part for the stabplate connection, for installation at an underwater structure, the first part having a first, mateable portion of the stabplate connection;
  a second part for the stabplate connection, the second part having an umbilical connected at a region of the underside of the second part between a second, mateable portion of the stabplate connection and a counterweight portion of the second part; and
  a lift line connected to the second part at a region above said region of the underside of the second part, so that the second part may be lowered with the second part disposed substantially horizontal during lowering, for the first and second portions to be mated with each other.

The present invention also comprises a method of providing an underwater stabplate connection by lowering a counterbalanced first part of the connection in a horizontal disposition by a lift line, the first part being attached to an umbilical, and mating the first part of the connection with a second part of the connection, the second part being attached to an underwater structure.

The invention allows both the use of a vessel of opportunity and, perhaps, less experienced ROV pilots, and will significantly ease installation. The technique is applicable to all hydraulic flying leads but particularly those that contain high collapse resistant (HCR) hoses, as well as steel tube flying leads (SFLs). By judicious design of the lift point and counterweight, the second part of stabplate connection will hang level during lowering regardless of the weight of the flying lead bundle.

DETAILED DESCRIPTION OF THE INVENTION

Figure 1:
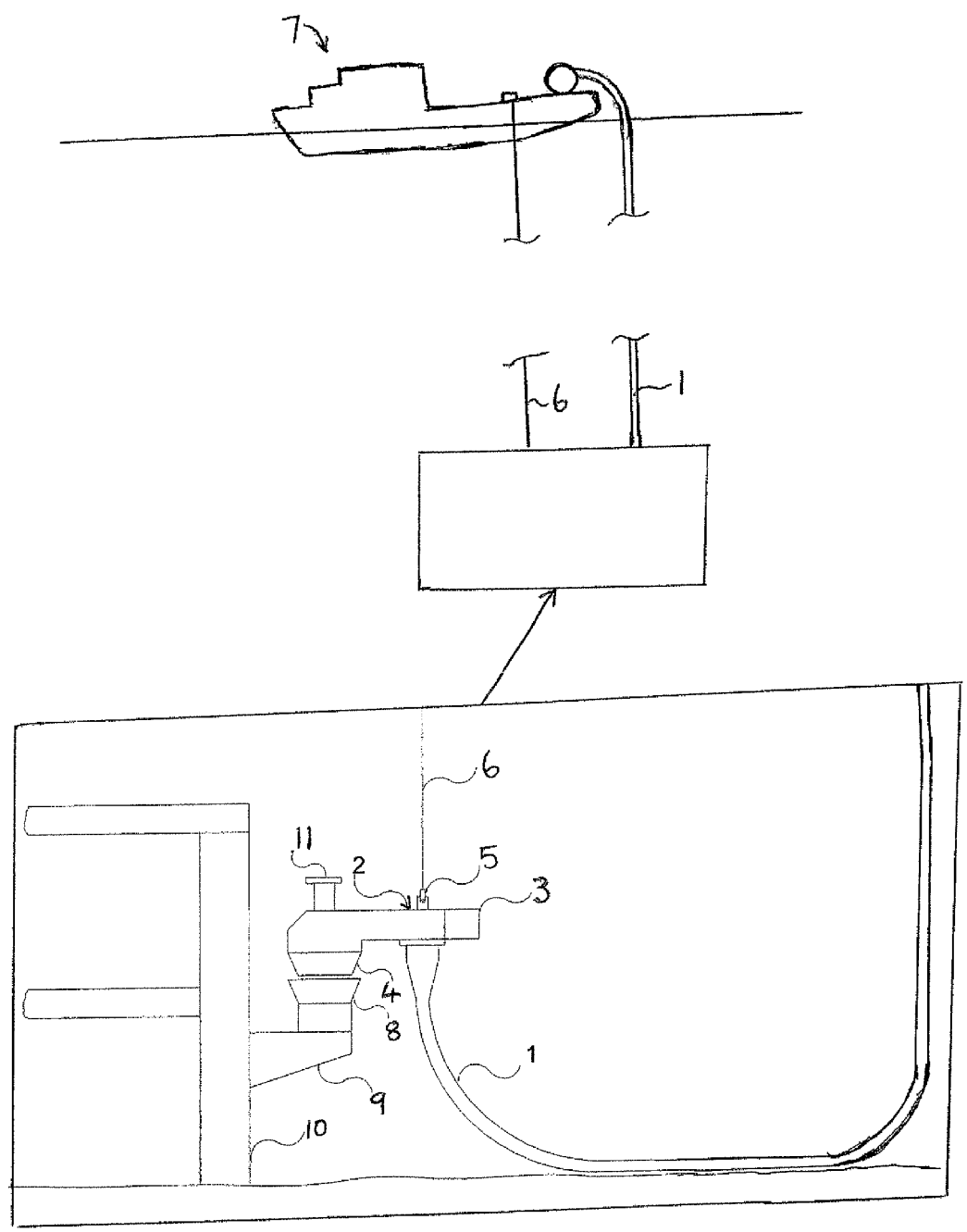
FIG. 1 illustrates diagrammatically the installation of a stabplate connection according to an example of the invention.

Referring to FIG. 1, an umbilical 1 is terminated by a connector assembly 2 comprising a first part of a stabplate connection. The umbilical is connected to the underside of assembly 2, between a counterweight portion 3 of the assembly 2 and a wet-mateable connector 4 of the assembly 2. The umbilical 1 could be an umbilical which carries at least one of (for example) electric power, hydraulic power, electrical signals, optical signals and chemicals or an umbilical in the form of an HFL, such as an SFL for example. The assembly 2 is attached by an ROV removable shackle 5 to a lift line 6 from a surface vessel 7, the shackle 5 being attached at a region directly above the region at which the umbilical is attached to the underside of assembly 2. The hydraulic and/or electrical and/or chemical and/or fibre optic feeds in the umbilical 1 are routed within the connector assembly 2 to respective connections in the wet-mateable connector 4, which faces downwards, at the end of the connector assembly 2. The connector 4 mates with the another, upwardly facing connector 8 which is attached to a structure 9 via a bracket 10, thus forming a horizontal stabplate. The structure 9 could be a well tree but the invention may be used with other forms of underwater structures. The connections in connector 4 engage with respective ones of connections in connector 8, the weight of the connector 4, and the rest of the end section of the connector assembly 2 being counterbalanced by counterweight portion 3 so that the connector assembly 2 is horizontal while being lowered.

The installation process is to lower the umbilical 1 by the lift line 6 from the surface vessel 7, laying the umbilical 1 on the seabed, until the connectors 4 and 8 are mated, if necessary using an ROV to make the final mating movement of connector 4. The connectors 4 and 8 are then locked together, by using an ROV to actuate a locking mechanism 10. FIG. 1 shows the connector assembly 2 in the position just before mating. An alternative locking arrangement is to employ an automatic locking mechanism (e.g. spring-loaded clamps) whereby an ROV is only required to unlock the mechanism if required for maintenance or repair.

By using its satellite navigation system, the vessel 7 can position itself accurately with respect to structure 10, so that the assembly 2 can be lowered from it for connectors 4 and 8 to mate, without the need for an ROV to drag assembly 2 and umbilical 1 into position.

ADVANTAGES OF USING THE INVENTION

Removal of the expensive installation process is avoided of detaching the umbilical from the installation vessel and employing an ROV to drag the umbilical along the seabed, to achieve mating of the connectors of the stabplate connection, which can result in adverse visibility conditions.

No ROV would be required at all if automatic connector to connector locking is employed, installation then being effected wholly by the installation vessel.

While this invention has been described and shown in some of its forms, it should be apparent to those skilled in the art that it is not so limited but is susceptible to various changes without departing from the spirit and scope of the invention. In the drawing and specification, there has been disclosed an illustrative embodiment of the invention and, although specific terms are employed, they are used in a generic and descriptive sense only and not for the purpose of limitation, the scope of the invention being set forth in the following claims.

The invention claimed is:

1. A method of providing an underwater stabplate connection, comprising:

providing at an underwater structure a first part having a first, mateable portion of the stabplate connection;

providing a second part of the stabplate connection, the second part including a second mateable portion of the stabplate connection and a counter-weight portion;

connecting an umbilical from a surface facility to a region of the underside of the second part between said second mateable portion of the stabplate connection and said counterweight portion;

lowering the second part from the surface facility together with the umbilical using a lift line connected to the second part above said region of the underside of the second part, so that the second part is disposed substantially horizontal during lowering; and causing said first and second portions to mate with each other, wherein said first and second portions are disposed so that they mate with each other in a vertical direction.

2. The method of claim 1, wherein said umbilical is selected from the group consisting of: an umbilical which carries at least one of electric power, hydraulic power, electrical signals, optical signals and chemicals; a hydraulic flying lead; and a steel tube flying lead.

3. The method of claim 1, wherein said second part and said umbilical are lowered from a surface vessel.

4. The method of claim 1, wherein said causing is carried out using a remotely operated vehicle.

5. The method of claim 1, wherein said structure comprises a well tree.

6. The method of claim 1, wherein said region at which said lift line is connected to said second part is directly above said region of the underside of said second part.

7. An underwater stabplate connection provided by the method of claim 1.

8. Apparatus for providing an underwater stabplate connection, comprising:

a first part for the stabplate connection, for installation at an underwater structure, the first part having a first, mateable portion of the stabplate connection;

a second part for the stabplate connection, the second part including a second mateable portion of the stabplate connection and a counterweight portion;

an umbilical connected from a surface facility to a region of the underside of the second part between said second, mateable portion of the stabplate connection and said counterweight portion; and a lift line connected to the second part at a region above said region of the underside of the second part, so that the second part may be lowered with the second part disposed substantially horizontal during lowering, for the first and second portions to be mated with each other wherein said first and second portions are disposed so that they mate with each other in a vertical direction.

* * * * *